United States Patent Office 2,994,709
Patented Aug. 1, 1961

2,994,709
PROCESS FOR THE DEGRADATION OF THE SIDE CHAIN OF BILE ACID DERIVATIVES
Leon Julius Rubin and Charles Kenneth Cross, Toronto, Ontario, Canada, assignors to Canada Packers Limited, Toronto, Ontario, Canada, a corporation
No Drawing. Filed Aug. 1, 1956, Ser. No. 601,367
7 Claims. (Cl. 260—397.5)

This invention relates to the preparation of steroid substances, and more particularly to a method of degrading the side-chain attached at the 17 carbon of bile acid materials.

Bile acids are the characteristic constituents of bile. There are different bile acids in different classes of animals, the difference being in the position of the alcohol groups and in the number of such groups, but they all have the basic structure of cholanic acid. Thus in hog bile there occurs hyodesoxycholic acid which is cholanic acid in which hydroxy groups are present in the 3 and 6 positions. This substance can therefore be named 3,6-dihydroxycholanic acid. Another example is cholic acid found in beef bile. It is 3,7,12-trihydroxycholanic acid. These bile acids are all characterized by a side-chain attached at the 17 carbon position, of the structure

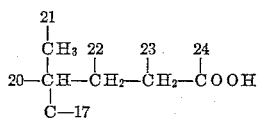

where the numerals 17 and 20 to 24 indicate the carbon position numbering system commonly employed in representing the side-chain of cholanic acids and derivatives thereof.

In the production of steroid substances from such bile acids, it is desirable to remove at least three of the carbon atoms contained in the 17 position side-chain thereof. There are several methods for accomplishing such removal. It is possible to partially degrade this chain and, in a series of repeated steps, eliminate the desired number of carbon atoms. However, this process is extremely tedious, resulting in unpredictable and unsatisfactory yields.

It is otherwise possible to radically oxidize this side-chain with an agent such as chromic acid. However, this reaction is incomplete and results in a variety of degraded side-chains differing in the number of carbon atoms retained by the end product, and at the same time it attacks the basic cholanic acid nucleus.

Still another method involves the reaction of a bile acid derivative with a halogenating agent. The halogen derivative so produced is treated with a dehydrohalogenating agent and the side chain of the resulting product is degraded by oxidation. The halogenation step is carried out in a solvent such as carbon tetrachloride. The halogen derivative, however, is unstable in the solvents heretofore used. This rapid decomposition of the halogen derivative in such solvent systems results in a loss of yield of the end product if the reaction is permitted to continue to completion. On the other hand, if the reaction is carried out for only a short period of time, wherein very little decomposition occurs, there is only a partial reaction of the constituents and a consequent low yield of end product. Thus, it is the common practice to accelerate the reaction by employing a light source as a catalytic agent. This light speeds up the reaction, but when light is employed as a catalyst, the installation of expensive and particularized plant equipment is required, providing safety problems of considerable magnitude.

We have discovered an improvement in the halogenation step in this method of degrading the side-chain attached at the 17 carbon position of bile acids, which improvement overcomes these undesirable features. This novel procedure involves the use of a solvent for the halogenation reaction consisting of saturated aliphatic hydrocarbons boiling at a temperature of 30 to 100° C. and the use of a free radical promoting catalyst. In this solvent the halogen derivative is extremely stable. Thus, the reaction may be continued to completion without resulting in decomposition of the halogen compound and in the absence of a light catalyst. Therefore, the installation of complex and expensive equipment is eliminated, and the undue safety hazards connected with the employment of electrical circuits adjacent to the solvent systems are avoided.

Although the halogenation reaction of our invention can be carried out in the absence of any catalyst, the yields are not satisfactory and for this reason a "free-radical promoting catalyst" is added to the halogenation mixture. Free-radical promoting catalysts which we have found to give good results when used in accordance with this invention are the diacyl peroxides such as diacetyl peroxide and dibenzoyl peroxide, the dialkyl peroxides such as di-t-butyl peroxide and the azodinitrile compounds such as $\alpha,\alpha'$-azodiisobutyronitrile. These substances added in minute quantities have a powerful catalytic effect and do not destroy the desired halogenated product, and in this manner excellent yields are obtained.

The starting material we prefer for our novel halogenation reaction is a bile acid derivative having a side-chain attached at the 17 carbon, which side-chain has a double bond between carbon atoms 23 and 24, and which side-chain has blocking groups substituted at the 24 carbon.

Excellent results are obtained when the starting material for the halogenation reaction is a bile acid derivative having at the 17 carbon position a side-chain of the structure

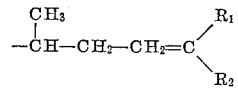

where $R_1$ and $R_2$ are each represented by a member of the group consisting of hydrogen and lower alkyl and aryl radicals. However, it will be understood that the reaction may be suitably carried out utilizing a bile acid material with a 17 position side-chain having any substituent radical which is compatible with the novel reaction.

The bile acid material employed in this invention can be prepared from bile by several well-known procedures. For instance suitable hyodesoxycholic acid material may be obtained from hog bile by well known methods. A suitable starting material for our reaction may be prepared from such hyodesoxycholic acid by several procedures. One of such methods involves the reaction of hyodesoxycholic acid with methanol to form the methyl ester of hyodesoxycholic acid, having attached at the 17 carbon position, a side-chain of the structure

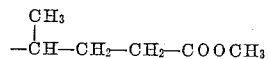

The methyl ester is reacted, for example, with a Grignard reagent, such as the phenyl magnesium halide to form the diphenyl carbinol derivative of the hyodesoxycholic acid, having attached at the 17 carbon position, a side-chain of the structure

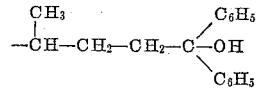

This hyodesoxycholic acid derivative may then be reacted with acetic anhydride in the presence of acetic acid to provide a diacetoxy ethylene derivative of hyodesoxycholic acid having a side-chain attached at the 17 carbon position of the structure

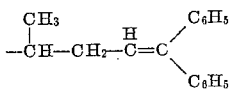

This product is an example of a suitable starting material for our reaction. It will be understood that the phenyl substituents may be replaced by hydrogen, lower alkyl or other aryl radicals.

In practicing our improved process, the hyodesoxycholic acid starting material is reacted with a halogenating agent. Preferably a halogenating agent is employed which is capable of specifically introducing the halogen at the 22 carbon of the side-chain attached at the 17 carbon of the hyodesoxycholic acid derivative. Excellent results are obtained when the halogenating agent is a member of the group consisting of a carboxylic acid imide, amide and aryl amide halogenated at the nitrogen atom. Exceedingly desirable results are obtained when the halogen constituent of any of these halogenating agents is the element bromine. Our preferred halogenating agent is N-bromosuccinimide.

The resulting halogenated bile acid derivative has a side-chain attached at the 17 carbon position, of the structure

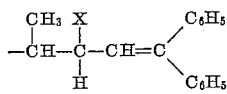

where X represents a halogen atom.

The novel solvent media for the improved halogenation reaction are saturated aliphatic hydrocarbons having boiling points in the range of 30 to 100° C. These hydrocarbons are available commercially as highly purified fractions containing substantially a single compound such as hexane, or as mixtures of hydrocarbons boiling over a specified range, such as those identified commercially as the "Skellysolve" series, e.g., Skelly B, C, F, G, H, etc., manufactured by Skelly Oil Co. of Kansas City, Missouri.

Preferably, saturated aliphatic hydrocarbons boiling at temperatures in the range of 50 to 80° C. are employed, and excellent results are realized when a saturated aliphatic hydrocarbon boiling at a temperature of about 60 to 70° C. is utilized in the reaction.

As already stated, the reaction is carried out in the presence of a free-radical-promoting catalyst such as the above-mentioned diacyl peroxides, dibenzoyl peroxide and diacetyl peroxide, the azodinitrile compound, $\alpha,\alpha'$-azo-diisobutyronitrile, or the dialkyl peroxide, di-t-butyl peroxide. Such catalysts function by first undergoing break-down to provide in the solutions of hydrocarbons, free radicals that are capable of initiating a free-radical reaction such as the reaction between the steroid and the halogenating agent. The term "free-radical-promoting catalyst" thus includes any catalyst known to function in this manner.

In order to remove traces of hydrogen halide, it is preferable to introduce into the reaction mixture an inorganic alkaline reagent that will react with the halide, such as, for example, solid sodium or potassium bicarbonate or calcium oxide.

The halogenation reaction has been studied at length, and it has been determined that the reaction is substantially completed in about one hour's time. However, the properties of the special saturated aliphatic hydrocarbon solvent used in the process according to the invention are such that there is no destruction of the reaction product as the time period is extended.

After the halogenation reaction has been completed, and solid substances such as succinimide and sodium bicarbonate have been filtered off, the solvent medium can be separated from the reaction product by a variety of methods. However, the low-boiling property of our special saturated aliphatic hydrocarbons permits removal thereof by suitable distillation procedures. This distillation may be effected at atmospheric or reduced pressure at a temperature which will provide evolution of the solvent vapor without destroying the reaction product.

Any dehydrohalogenating agent may be employed in our method. However, especially desirable results are obtained when a mixture of sodium acetate and acetic acid is utilized.

The yields from our method are practically quantitative, being in the order of 85%, and the reaction product is especially desirable as a starting material for the preparation of a variety of useful steroids, particularly the 20-ketosteroids.

The newly formed double bond may be split by oxidation, thereby degrading the side chain. We mention, for example, such oxidizing agents as chromic acid, permanganates and peroxides. The resultant product has a side-chain attached at the 17 carbon position of the structure

This compound may be readily converted to a variety of steroids by several methods. For example, the end product of the oxidation may be a 3,6-diacetoxypregnane-20-one. This material may be converted to pregnenolone and then to progesterone by well-known procedures.

The following examples of our improved method will serve further to illustrate the invention.

*Example I*

The diphenyl choladiene derivative of hyodesoxycholic acid was prepared from the corresponding cholanyl diphenyl ethylene by the following method. To 5.0 grams of crystallized cholanyl diphenyl ethylene derivative of hyodesoxycholic acid, dissolved in 60 milliliters of hexane was added 1.80 grams of N-bromosuccinimide, 0.90 gram of sodium bicarbonate and 0.2 milliliter of 25% diacetyl peroxide in dimethyl phthalate (0.05 gram of diacetyl peroxide). This bromination reaction mixture was refluxed under constant agitation for a period of one hour. The precipitate thereupon formed was separated from the supernatant liquid by filtration. The filtrate therefrom was combined with 5.0 grams of anhydrous sodium acetate and 55 milliliters of acetic acid to provide a dehydrobromination reaction. Thereafter, the hexane was removed by distillation, and the residue therefrom was refluxed for a period of one-half hour. The reaction mixture was then poured into cold water, and the precipitate was filtered out, washed with additional water, and dried in vacuum at 60° C. The yield of $\Delta^{20,23}$-3,6-diacetoxy-24,24-diphenyl choladiene was 4.96 grams, and had an $E_{1cm.}^{1\%}$ value of 398

*Example II*

$\Delta^{20,23}$-3,6-diacetoxy-24,24-diphenyl choladiene was prepared from the corresponding cholanyl diphenyl ethylene by the following method. To 5.0 grams of crystallized cholanyl diphenyl ethylene derivative in 60 milliliters of hexane was added 1.8 grams of N-bromosuccinimide, 0.90 gram of sodium bicarbonate and 0.05 gram of dibenzoyl peroxide. This bromination reaction mixture was refluxed for a period of one hour under constant agitation. The refluxed mixture was filtered and the filtrate was combined with 55 milliliters of acetic acid and 5.0 grams of anhydrous sodium acetate. The hexane was removed by distillation and the residue therefrom refluxed for a period of one-half hour. This refluxed residue was poured into cold water, and the precipitate was filtered out, washed with additional water, and dried in a vacuum oven at 65° C. The yield of dried product was 5.0 grams having an $E_{1cm}^{1\%}$ value of 372

Example III

The reaction described in Example II was carried out in an identical manner with the exception that 0.10 gram of dibenzoyl peroxide were employed as catalyst. The yield of dried product was 5.0 grams having an $E_{1\,cm.}^{1\%}$ value of 371

Example IV

The diphenyl choladiene derivative of hyodesoxycholic acid was prepared from the corersponding ethylene material by the following method.

To 5.0 grams of crystallized cholanyl diphenyl ethylene derivative in 60 milliliters of hexane was added 1.8 grams of N-bromosuccinimide, 0.90 gram of sodium bicarbonate, and 0.150 grams of $\alpha,\alpha'$-azo-diisobutyronitrile. This bromination reaction mixture was refluxed for a period of one hour under constant, vigorous agitation. The precipitate thereupon formed was separated from the supernatant liquid by filtration. The filtrate therefrom was combined with 55 milliliters of acetic acid containing 5.0 grams of anhydrous sodium acetate to provide a dehydrobromination reaction. Thereafter, the hexane was removed by distillation, and the residue therefrom was refluxed for a period of one-half hour. The reaction mixture was then poured into cold water, and the precipitate was filtered out, washed with additional water, and dried in vacuum at 60° C. The yield of $\Delta^{20,23}$-3,6-diacetoxy-24,24-diphenyl choladiene was 5.0 grams and had an $E_{1\,cm.}^{1\%}$ value of 399

Example V

A reaction similar to that of example IV but employing 0.30 gram of $\alpha,\alpha'$-azo-diisobutyronitrile yielded 5.0 grams of product having an $E_{1\,cm.}^{1\%}$ value of 401

This corresponds to 86.8% of diene.

Example VI

A reaction similar to that of Example IV employing 0.05 gram of $\alpha,\alpha'$-azo-diisobutyronitrile yielded 5.0 grams of product having an $E_{1\,cm.}^{1\%}$ value of 348

Example VII $\Delta^{20,23}$-3,6-diacetoxy-24,24-diphenyl choladiene was prepared from the corresponding cholanyl diphenyl ethylene by the following method. To 5.0 grams of recrystallized cholanyl diphenyl ethylene derivative in 60 milliliters of Skelly B, i.e. a petroleum hydrocarbon fraction having a boiling point of from 60–80° C., was added 1.8 grams of N-bromosuccinimide, 0.90 gram of sodium bicarbonate and 0.4 ml. of 25% diacetyl peroxide solution in dimethyl phthalate (0.10 gram of diacetyl peroxide). This bromination reaction mixture was refluxed for a period of one hour under constant agitation. The refluxed mixture was filtered and the precipitate thereby separated from the supernatant liquid. The filtrate therefrom was combined with 55 milliliters of acetic acid containing 5.0 grams of anhydrous sodium acetate. The Skelley B was removed by distillation and the residue therefrom refluxed for a period of one-half hour. This refluxed residue was poured into cold water and the precipitate was filtered out, washed with additional water till acid-free, and dried in a vacuum oven at 70° C. The yield of dried product was 5.0 grams having an $E_{1\,cm.}^{1\%}$ value of 363

Example VIII

A fifty gallon, glass-lined reactor was charged with 14.25 pounds of 3,6-diacetoxy-24,24-diphenyl-$\Delta^{23}$-cholene, 105 pounds of hexane and 2.5 pounds of sodium bicarbonate. This mixture was agitated and then there were added 5.25 pounds of N-bromosuccinimide and 250 milliliters of a 25% solution of diacetyl peroxide in dimethyl phthalate. The contents of the reaction vessel were heated to reflux for a period of one hour during which time efficient agitation was continued. The mixture was then filtered rapidly and the filtrate was pumped into a reactor containing 185 pounds of acetic acid and 14.25 pounds of sodium acetate. On heating, the hexane distilled off and after this solvent had been removed completely, the dehydrobromination mixture was refluxed for half an hour. It was then pumped into a still containing 40 gallons of cold water and the resulting precipitate was filtered off and dried to provide 14.75 pounds of product having an $E_{1\,cm.}^{1\%}$ value of 370

This corresponds to a yield of 82.5% of pure 3,6-diacetoxy-24,24-diphenyl-$\Delta^{20,23}$-choladiene.

Example IX $\Delta^{20,23}$-3,12-diocetoxy-24,24-diphenyl choladiene was prepared from the corresponding cholanyl diphenyl ethylene by the following method.

To 5.0 grams of crystalline cholanyl diphenyl ethylene derivative of desoxycholic acid in 60 milliliters of hexane was added 1.8 grams of N-bromosuccinimide, 0.90 gram of sodium bicarbonate, 0.2 milliliter of 25% diacetyl peroxide in dimethyl phthalate (.05 gram of diacetyl peroxide). This bromination reaction mixture was refluxed under constant agitation for a period of forty minutes. The precipitate thereupon formed was separated from the supernatant liquid by filtration. The filtrate therefrom was combined with 4.5 grams of anhydrous sodium acetate and 57 milliliters of acetic acid to provide a dehydrobromination reaction. Thereafter, the hexane was removed by distillation, and the residue therefrom was refluxed for a period of one-half hour. The refluxed residue was combined with water, filtered, washed with additional water and dried in vacuum at 50° C. The yield of dried product was 4.96 grams having an $E_{1\,cm.}^{1\%}$ value of 372

This corresponds to 80% of pure diene. Bile acids other than those employed in the foregoing examples that could be used in the process according to the invention include cholic acid and lithocholic acid.

Instead of N-bromosuccinimide, employed in the foregoing examples, any halogenating agent suitable for incorporating an halogen element in the side-chain attached at the 17 carbon position of a bile acid material can be used.

Instead of the mixture of acetic acid and sodium acetate, employed in the foregoing examples, any dehydrohalogenating agent suitable for the removal of a halogen element from the side-chain attached at the 17 carbon position of a bile acid material, which removal results in the formation of a double bond in such side-chain, can be substituted.

While in the foregoing specification the novel method of this invention has been described in considerable detail by reference to specific embodiments thereof, it will be apparent to those skilled in the art that the invention is susceptible to other embodiments and that many of the details set forth can be varied widely without departing from the basic concepts of the invention.

What we claim as our invention is:

1. In a method of degrading the side-chain attached to the 17 carbon of a bile acid, the step which comprises halogenating a bile acid derivative having attached at the 17 carbon a side-chain of the formula

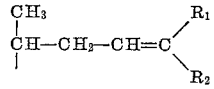

in which $R_1$ and $R_2$ each represent a member of the group consisting of hydrogen and lower alkyl and aryl radicals, by reacting said bile acid derivative with a compound selected from the group consisting of carboxylic acid imides, amides and aryl amides halogenated at the nitrogen atom, said reaction being carried out in a hexane solvent and in the presence of a free radical promoting catalyst selected from the group consisting of the diacyl peroxides, the dialkyl peroxides and azodinitrile compounds.

2. The method of claim 1 wherein said bile acid derivative is a derivative of desoxychloric acid having attached at the 17 carbon a side chain of the formula

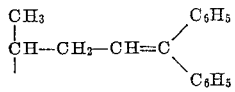

and wherein said derivative is halogenated by retraction with N-bromosuccinimide.

3. The method of claim 1 wherein said bile acid derivative is a derivative of hyodesoxycholic acid having attached at the 17 carbon a side chain of the formula

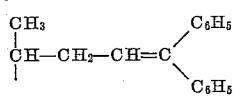

and wherein said derivative is halogenated by reaction with N-bromosuccinimide.

4. The method of claim 3 wherein said free-radical promoting catalyst is diacetyl peroxide.

5. The method of claim 3 wherein said free-radical promoting catalyst is dibenzoyl peroxide.

6. The method of claim 3 wherein said free-radical promoting catalyst is α,α'-azo-diisobutyronitrile.

7. The method of claim 3 wherein the reaction is carried out in the presence of said free-radical promoting catalyst and in the presence of an inorganic alkaline reagent that will remove traces of hydrogen halide.

References Cited in the file of this patent

UNITED STATES PATENTS

| 2,461,911 | Miescher et al. | Feb. 15, 1949 |
| 2,461,912 | Meischer et al. | Feb. 15, 1949 |
| 2,684,863 | Schock et al. | July 27, 1954 |
| 2,727,906 | Hasbrouck et al. | Dec. 20, 1955 |

OTHER REFERENCES

Schmid et al.: Helv. Chim. Acta, vol. 29 pp. 573–581 (1946).